(12) United States Patent
Spiegel

(10) Patent No.: US 11,851,065 B2
(45) Date of Patent: Dec. 26, 2023

(54) DITCH AND OBSTRUCTION DETECTION SYSTEM FOR MOTOR VEHICLES

(71) Applicant: Elmos Semiconductor AG, Dotrmund (DE)

(72) Inventor: Egbert Spiegel, Marl (DE)

(73) Assignee: ELMOS SEMICONDUCTOR SE, Dortmund (DE)

( * ) Notice: Subject to any disclaimer, the term of this patent is extended or adjusted under 35 U.S.C. 154(b) by 773 days.

(21) Appl. No.: 16/406,186

(22) Filed: May 8, 2019

(65) Prior Publication Data
US 2019/0359217 A1 Nov. 28, 2019

(30) Foreign Application Priority Data
May 28, 2018 (DE) ...................... 10 2018 112 748.0

(51) Int. Cl.
*B60W 40/02* (2006.01)

(52) U.S. Cl.
CPC ......... *B60W 40/02* (2013.01); *B60W 2420/00* (2013.01); *B60W 2554/00* (2020.02)

(58) Field of Classification Search
CPC ............ B60W 40/02; B60W 2554/00; B60W 2420/00; G06T 7/00; G06T 2207/10132; G01B 11/00; G01B 11/22
See application file for complete search history.

(56) References Cited

U.S. PATENT DOCUMENTS

| | | | | |
|---|---|---|---|---|
| 5,287,183 A * | 2/1994 | Thomas | ................ | H04N 23/81 348/E5.037 |
| 6,364,835 B1 * | 4/2002 | Hossack | ............. | G01S 7/52085 600/443 |
| 8,069,008 B2 * | 11/2011 | Kusunose | .............. | G01B 11/22 702/166 |
| 2003/0156585 A1 * | 8/2003 | Minami | ................... | G01C 9/00 370/392 |
| 2010/0049452 A1 * | 2/2010 | Suginouchi | ............. | G01S 15/42 702/56 |

(Continued)

FOREIGN PATENT DOCUMENTS

| | | |
|---|---|---|
| CN | 202055145 U | 11/2011 |
| CN | 206496740 U | 9/2017 |

(Continued)

*Primary Examiner* — Dale W Hilgendorf
*Assistant Examiner* — Frank T Glenn, III
(74) *Attorney, Agent, or Firm* — MINDFUL IP PLLC; Michael J McCandlish

(57) ABSTRACT

The disclosure relates to a method and an associated device for detecting uneven surfaces in vehicle environments. The method comprises emitting a first ultrasonic pulse or first ultrasonic burst and emitting a second ultrasonic pulse or second ultrasonic burst, and receiving a first reflection signal of the first ultrasonic pulse or a first reflection signal of the first ultrasonic burst and receiving a second reflection signal of the second ultrasonic pulse or a second reflection signal of the second ultrasonic burst. In the further course of the method, a comparison is made of the first reflection signal with the second reflection signal, and the presence of a surface unevenness in the vehicle's environment, or the presence of a surface curvature in the vehicle's environment, is determined.

12 Claims, 2 Drawing Sheets

(56) References Cited

U.S. PATENT DOCUMENTS

2012/0071758 A1* 3/2012 Lachaine ............. A61N 5/1049
600/443
2019/0031100 A1* 1/2019 Lee ..................... G01S 7/52006
2019/0122056 A1* 4/2019 Tran ........................ G01S 15/88

FOREIGN PATENT DOCUMENTS

| DE | 10 2004 036 120 A1 | | 3/2006 | |
|----|----|----|----|----|
| DE | 10 2008 062 340 A1 | | 6/2010 | |
| GB | 2494020 A | * | 2/2013 | ........... G01S 13/931 |
| GB | 2494020 A | | 2/2013 | |
| JP | S6249280 A | | 3/1987 | |

* cited by examiner

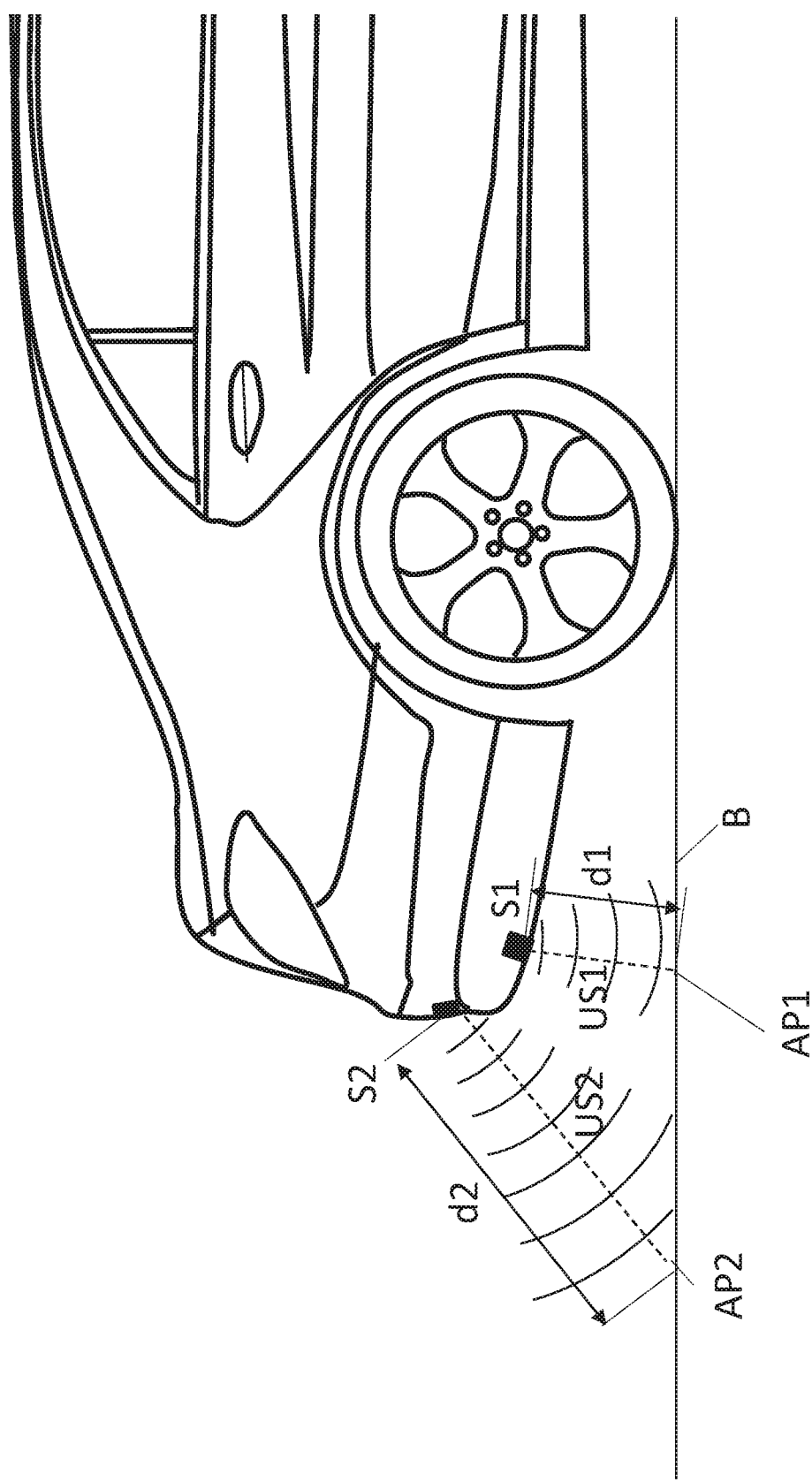

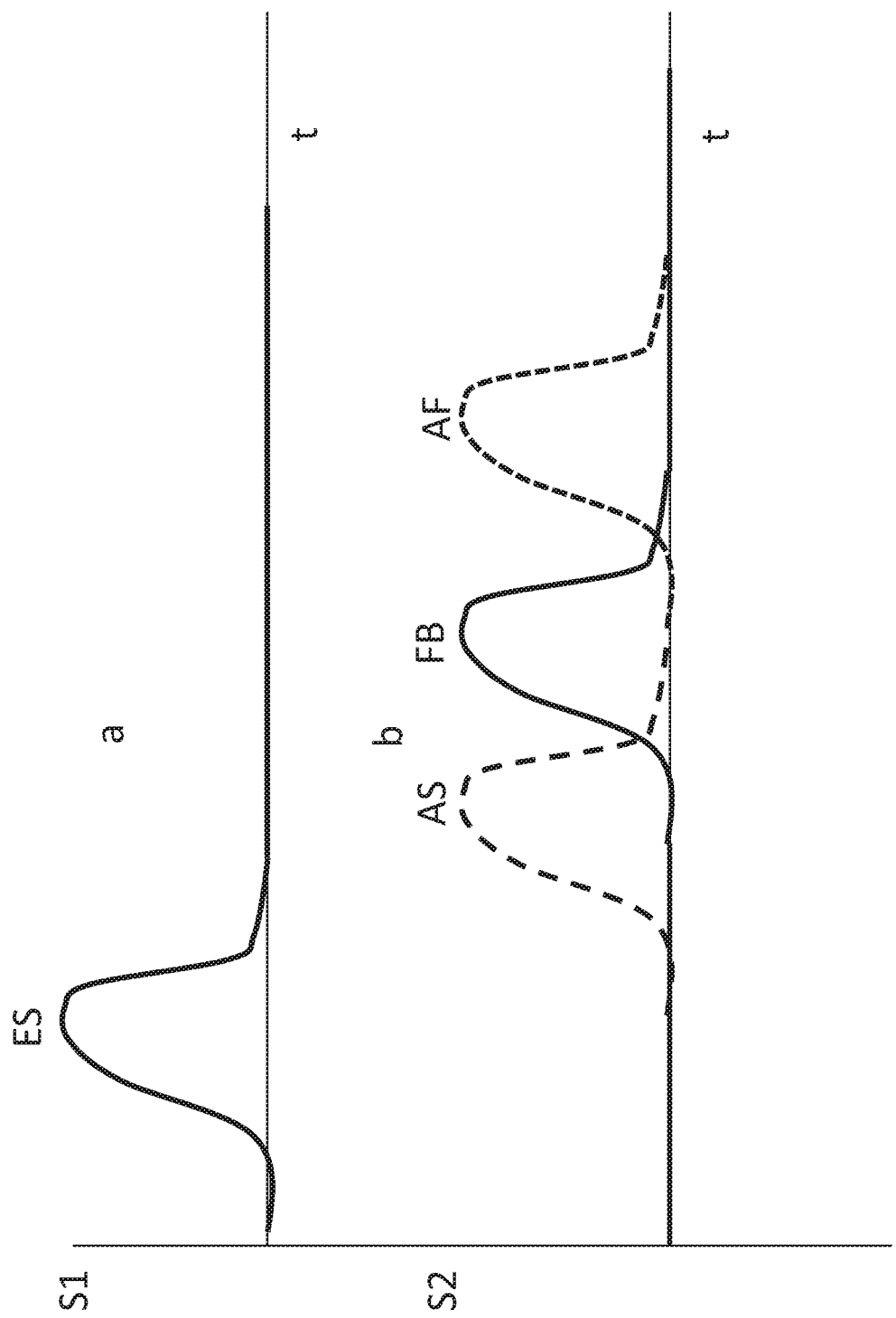

DITCH AND OBSTRUCTION DETECTION SYSTEM FOR MOTOR VEHICLES

CROSS-REFERENCE TO RELATED APPLICATIONS

This application claims priority to German Application No. DE 10 2018 112 748.0, filed on May 28, 2018, which application is hereby incorporated herein by reference in its entirety.

PREAMBLE

The disclosure relates to a method and an associated device for detecting uneven surfaces in vehicle environments.

General Introduction

It is often necessary to park a motor vehicle on dirt roads near roadside ditches and other obstructions, e.g. curbs or so-called curbstones in parking garages. Vehicles increasingly rely on sensors to detect these ditches and other obstructions.

The object of the disclosure is to therefore present methods and systems for detecting ditches and obstructions with sensors on a vehicle.

The methods and systems are described below.

Solution to the Problem Addressed by the Disclosure

The method according to the disclosure for detecting uneven surfaces in vehicle environments begins with transmitting a first ultrasonic pulse or a first ultrasonic burst in the form of a first ultrasonic beam at a first, typically steeper angle from a first ultrasound sensor toward the surface and emitting a second ultrasonic pulse or a second ultrasonic burst in the form of a second ultrasonic beam at a second, flatter angle from a second ultrasound sensor toward the surface or in a nearly horizontal direction. The first ultrasonic beam therefore strikes the surface at a shorter distance to the first ultrasound sensor at first point of impact than the second distance to the second ultrasound sensor at the second point of impact, where the second ultrasonic beam strikes the surface. In an example, the first ultrasound sensor and the second ultrasound sensor are located close to one another.

The first ultrasonic beam is reflected by the surface at the first point of impact, and returns to the first ultrasound sensor after travelling the distance from the first ultrasound sensor to the first point of impact and back to the first ultrasound sensor. The first ultrasound sensor receives this reflection of the first ultrasonic pulse or the reflection of the first ultrasonic burst and converts the reflection into a first reflection signal.

The second ultrasonic beam is reflected by the surface at the second point of impact, and returns to the second ultrasound sensor after travelling the distance from the second ultrasound sensor to the second point of impact and back to the second ultrasound sensor. The second ultrasound sensor receives this reflection of the second ultrasonic pulse or the reflection of the second ultrasonic burst and converts the reflection into a second reflection signal.

An analyzer then compares the first reflection signal with the second reflection signal and determines the presence of an uneven surface in the vehicle's environment. In an example, the analyzer indicates such uneven surfaces to a superordinate computer system.

In a further example, the method according to the disclosure is modified such that the step for comparing the first reflection signal with the second reflection signal and the determining of the presence of uneven surfaces in the vehicle's environment comprises a step for cross-correlation of the first reflection signal and the second reflection signal. The cross-correlation is typically preceded by a scaling of a temporal segment of the first reflection signal and a scaling of a corresponding temporal segment of the second reflection signal. This is not absolutely necessary, but it is recommended. The analyzer then forms a cross-correlation signal between predetermined temporal segments of the first and second reflection signals. In an example, the analyzer compares the amplitude of the cross-correlation signal with a threshold value, and determines a point in time at which the threshold value is exceeded by the amplitude of the cross-correlation signal. This is the point in time when the second ultrasound signal of the second ultrasound sensor requires longer to strike the surface than the first ultrasound signal of the first ultrasound sensor, which is steeper. Because the signal of the first ultrasound sensor has travelled a shorter distance than the signal of the second ultrasound sensor, the second reflection signal should be received later than the first reflection signal. When a flat surface is used as a reference, this temporal difference is predetermined. If the temporal difference is greater, then the surface curves downward, thus indicating a downward slope, and if the temporal difference is less, then the surface is curved upward in the vehicle's environment. If the temporal difference determined in this manner exceeds a predetermined amount, the analyzing unit, i.e. the analyzer, can determine the presence of a surface unevenness. This is the case in particular when the point in time determined by the correlation, which corresponds to this temporal offset, lies prior to an earliest permitted point in time for exceeding the threshold value, or when this point in time lies after an earliest permitted point in time, or when this threshold value is not exceeded. The reflections are typically expected within a specific time period after being emitted. It therefore makes sense to multiply each of the reflection signals with a gate signal, prior to forming the cross-correlation. The respective gate signal for a reflection signal is such that it is set to 1 in the time period in which the reflection signal is expected, and to 0 at the other times. The uneven surfaces that are to be detected are typically potholes, rocks in front of the motor vehicle, parking boundaries, or upward or downward steps or ledges or landings.

In another example, a second, equivalent method for detecting uneven surfaces in vehicle environments again begins with emitting a first ultrasonic pulse or first ultrasonic burst and emitting a second ultrasonic pulse or second ultrasonic burst. This is followed here as well by receiving the reflection of the first ultrasonic pulse or the reflection of the first ultrasonic burst at a first point in time, and receiving the reflection of the second ultrasonic pulse or the reflection of the second ultrasonic burst at a second point in time. The first point in time is subsequently compared with a first time window that begins and ends after emitting the first ultrasonic pulse or first ultrasonic burst, and the second point in time is compared with a second time window that begins and ends after emitting the second ultrasonic pulse or second ultrasonic burst. This corresponds to the aforementioned gate signal. Subsequently, the points in time are evaluated in relation to the time windows. An analysis unit, the analyzer, then determines that the surface is flat when the first point in time lies within the first time window and the second point in time lies within the second time window. It determines the presence of a relevant negative surface unevenness when the first point in time lies within the first time window and the second point in time lies temporally after the temporal end of the second time window, or when no second point in time could be determined, or when the first point in time lies temporally after the temporal end of the first time window and the second point in time lies temporally after the temporal end of the second time window, or when no second time point could be determined. It determines the presence of a relevant positive surface unevenness when the first point in time lies within the first time window and the second point in time lies temporally prior to the temporal beginning of the second time window, or when the first point in time lies temporally prior to the temporal beginning of the first time window and the second point in time lies temporally prior to the temporal beginning of the second time window.

The first ultrasonic pulse or the first ultrasonic burst is preferably emitted in the form of a first ultrasonic beam, and the second ultrasonic pulse or the second ultrasonic burst is preferably emitted in the form of a second ultrasonic beam. The first ultrasonic beam is preferably oriented such that it strikes the surface at a first point of impact at a first distance if the surface is flat. The second ultrasonic beam is preferably oriented such that it strikes the surface at a second point of impact at a second distance if the surface is flat. If the surface is flat, the first distance between the first point of impact and the sensor is typically less than the second distance between the second point of impact and the sensor.

The uneven surfaces that are to be detected comprise potholes or rocks or parking boundaries, or upward or downward steps or ledges or landings.

The device according to the disclosure for detecting uneven surfaces in a vehicle's environment thus preferably comprises a first ultrasound sensor, a second ultrasound sensor, and an analyzer, which makes the comparisons. The first ultrasound sensor is configured to emit a first ultrasonic beam and the second ultrasound sensor is configured to emit a second ultrasonic beam. The first ultrasound sensor receives reflections of the first ultrasonic beam. The second ultrasound sensor receives reflections of the second ultrasonic beam. The first ultrasound sensor converts the received reflections of the first ultrasonic beam into a first reflection signal. The second ultrasound sensor converts the received reflections of the second ultrasonic beam into a second reflection signal. The first ultrasonic beam is oriented such that, if the surface is flat, it strikes the flat surface at a first distance at a first point of impact. The second ultrasonic beam is oriented such that if the surface is flat, it strikes the flat surface at a second distance at a second point of impact. If the surface is flat, the first distance between the first point of impact and the first ultrasound sensor is preferably less than the second distance between the second point of impact and the second ultrasound sensor. The first ultrasound sensor receives the reflection of the first ultrasonic beam at a first point in time after it has been emitted. The second ultrasound sensor receives the reflection of the second ultrasonic beam at a second point in time after it has been emitted. The analyzer compares the first point in time with a first time window, which begins and ends after emitting the first ultrasonic beam. The analyzer compares the second point in time with a second time window, which begins and ends after emitting the second ultrasonic beam. The analyzer preferably indicates a flat surface when the first point in time lies within the first time window and the second point in time lies within the second time window. The analyzer preferably indicates a relevant negative surface unevenness when the first point in time lies within the first time window and the second point in time lies temporally after the temporal end of the second time window, or when no second point in time could be determined. The analyzer preferably indicates a relevant positive surface unevenness when the first point in time lies within the first time window and the second point in time lies temporally prior to the temporal beginning of the second time window. The analyzer also indicates a positive surface unevenness when the first point in time lies temporally prior to the temporal beginning of the first time window and the second point in time lies temporally prior to the temporal beginning of the second time window.

The vehicle can be a non-autonomous motor vehicle or an autonomous motor vehicle. An autonomous vehicle can be manned or unmanned. By way of example, the vehicle can be an autonomous robot, e.g. a vacuum cleaner robot. The uneven surfaces can comprise steps, ledges or small landings.

In summary, the proposed device thus comprises a system for measuring the curvature of the surface (B) in the vehicle's environment by means of ultrasound and an associated method for measuring the curvature of the surface (B) in the vehicle's environment.

Advantage of the Disclosure

Such a disclosure enables navigation, for example, in those regions in which there are no clear driving pathway markings. By way of example, when navigating on unsurfaced parking areas, sliding into ditches is prevented. There may also be downward steps at one or more sides of a parking area. These can also be detected by the device according to the disclosure and the method according to the disclosure.

BRIEF DESCRIPTION OF THE DRAWINGS

FIG. 1 shows an example vehicle including two ultrasound sensors at different angles relative to a surface.

FIG. 2 is an example timing diagram of example reflected ultrasound signals.

DESCRIPTION

FIG. 1 shows the rear of an exemplary motor vehicle. A first ultrasound sensor (S1) emits a first ultrasound signal (US1) toward the surface (B) over a short distance (d1). A second ultrasound sensor (S2) emits a second ultrasound signal (US2) toward the surface (B) over a longer distance (d2). The first ultrasound signal (US1) strikes the surface (B) at a first point of impact (AP1). The second ultrasound signal (US2) strikes the surface (B) at a second point of impact (AP2). Because the second distance (d2) is greater than the first distance (d1), the first ultrasound signal (US1) requires less time to travel the distance from the first ultrasound sensor (S1) to the first point of impact (AP1) and back to the first ultrasound sensor (S1). The first ultrasound sensor (S1) receives the reflection of the first ultrasound signal (US1) against the surface (B) at the first point of impact (AP1). The second ultrasound sensor (S2) receives the reflection of the second ultrasound signal (US2) against the surface (B) at the second point of impact (AP2) in the same manner.

FIG. 2 shows, schematically, the reflected ultrasound signals (US1, US2) received by the ultrasound sensors (S1, S2) after reflection and reception thereof. FIG. 2a shows, schematically, the received signal of the first ultrasound sensor (S1) with the reflection of the first ultrasound signal (ES). FIG. 2b shows, schematically, the received signal of the second ultrasound sensor (S2) with the reflection of the second ultrasound signal (FB). The curve indicated by FB represents the temporal position of the reflection pulse with a flat surface (B). The curve indicated by AS schematically represents the exemplary temporal position of the reflection pulse when the surface rises, when there is a stone in the pathway, or there is a step or a landing located in the pathway. The curve indicated by AF represents the exemplary temporal position of the reflection pulse when the surface (B) dips, or there is a pothole or ditch located in the pathway, or a downward step or a downward ledge located in the pathway. The origins in the drawings in FIGS. 2a and 2b are selected as the respective point in time of emitting the respective ultrasound signals (US1, US2) and an equivalent temporal scale is also selected. The temporal delay between the curve (ES) of the received signal of the first ultrasound sensor (S1) with the reflection of the first ultrasound signal and the curve (FB) representing the temporal position of the reflection pulse with a flat surface (B), represents the temporal reference value for deciding whether the surface dips or rises. If the rise is greater than a predefined rise threshold value, a first alarm can be triggered. If the dip is greater than a predefined dip threshold value, a second alarm can be triggered.

What is claimed is:

1. A method comprising:
   emitting a first ultrasonic signal from a first sensor on a vehicle at a first angle relative to a surface on which the vehicle is operating;
   emitting a second ultrasonic signal from a second sensor on the vehicle at a second angle relative to the surface on which the vehicle is operating, wherein the second angle is flatter relative to the surface than the first angle;
   receiving a first reflection signal of the first ultrasonic signal by the first sensor;
   receiving a second reflection signal of the second ultrasonic signal by the second sensor;
   determining an expected difference between a first timing of the first reflection signal and a second timing of a second reflection signal based on a flat surface;
   comparing a difference between the first timing of the first reflection signal with the second timing of the second reflection signal with the expected difference between the first timing of the first reflection signal and the second timing of the second reflection signal based on a flat surface,
   wherein:
      the first reflection signal is received by the first sensor and based on the first ultrasonic signal from the first sensor,
      the second reflection signal is received by the second sensor and based on the second ultrasonic signal from the second sensor, and
      the expected difference between the first timing of the first reflection signal and the second timing of the second reflection signal based on the flat surface is non-zero, due to the difference in the first angle and the second angle;
   determining at least one of a presence of an unevenness in the surface on which the vehicle is operating or a presence of a curvature in the surface on which the vehicle is operating based on the comparison; and
   based on the determination, indicating surface conditions to a superordinate computer for navigating the vehicle and/or outputting an alarm in a case that a surface rise or a surface dip exceeds a respective rise or dip threshold,
   wherein comparing the difference between the first timing of the first reflection signal with the second timing of the second reflection signal with the expected difference between the first timing of the first reflection signal and the second timing of the second reflection signal based on a flat surface and determining the at least one of the presence of the surface unevenness or the presence of the surface curvature comprises:
      executing an amplitude-based cross-correlation between a first temporal segment of the first reflection signal from the first sensor and a second temporal segment of the second reflection signal from the second sensor, and
      generating a cross-correlation signal from the amplitude-based cross-correlation.

2. The method according to claim 1 wherein the first ultrasonic signal includes a first ultrasonic burst, and the second ultrasonic signal includes a second ultrasonic burst.

3. The method according to claim 1,
   wherein comparing the difference between the first timing of the first reflection signal with the second timing of the second reflection signal with the expected difference between the first timing of the first reflection signal and the second timing of the second reflection signal based on a flat surface and determining the presence of the surface unevenness in a vehicle environment or the presence of the surface curvature in the vehicle environment comprises:
      comparing an amplitude of the cross-correlation signal with a threshold value;
      determining a point in time at which the amplitude of the cross-correlation signal exceeds the threshold value;
      determining the presence of the surface unevenness or the presence of the surface curvature when the point in time is prior to an earliest permitted point in time, or when the point in time is after a latest permitted point in time, or when the threshold value is not exceeded.

4. The method according to claim 1,
   wherein at least one reflection signal is multiplied by a gate signal prior to obtaining the cross-correlation signal, and further wherein the gate is set to one in a time period in which the reflection signal is expected and set to zero at other times.

5. The method according to claim 1
   wherein the surface unevenness that is to be detected includes at least one of a pothole or a rock or a parking boundary, or a step, or a ledge or a landing.

6. The method of claim 1, wherein the cross-correlation is preceded by a first scaling of the first temporal segment of the first reflection signal and/or a second scaling factor of the second temporal segment of the second reflection signal.

7. A method for detecting a surface unevenness in a vehicle environment, comprising:
   emitting a first ultrasonic signal from a first sensor on a vehicle at a first angle relative to a surface on which the vehicle is operating;
   emitting a second ultrasonic signal from a second sensor on the vehicle at a second angle relative to the surface on which the vehicle is operating, wherein the second angle is flatter than the first angle;
   receiving a reflection of the first ultrasonic signal at a first point in time by the first sensor;

receiving a reflection of the second ultrasonic signal at a second point in time by the second sensor;

determining, based on a flat surface and the first angle for the first sensor, a first time window when a first reflection of the first reflection signal is expected;

determining, based on the flat surface and the second angle for the second sensor, a second time window when a second reflection of the second reflection signal is expected;

comparing the first point in time with the first time window, wherein the first time window is a period of time when the first reflection signal is expected based on the flat surface and first angle for the first sensor and begins and ends after emitting the first ultrasonic signal;

comparing the second point in time with the second time window, wherein the second time window is a period of time when the second reflection signal is expected based on the flat surface and second angle for the second sensor and begins and ends after emitting the second ultrasonic signal;

determining a presence of a flat surface in the vehicle environment when the first point in time lies within the first time window, and the second point in time lies within the second time window;

determining a presence of a relevant negative surface unevenness in the vehicle environment
  when the first point in time lies within the first time window and the second point in time lies temporally after a temporal end of the second time window, or when no second point in time could be determined; or
  when the first point in time lies temporally after a temporal end of the first time window, and the second point in time lies temporally after the temporal end of the second time window, or when no second point in time could be determined;

determining a presence of a relevant positive surface unevenness in the vehicle environment,
  when the first point in time lies within the first time window and the second point in time lies temporally prior to the temporal beginning of the second time window; or
  when the first point in time lies temporally prior to the temporal beginning of the first time window and the second point in time lies temporally prior to the temporal beginning of the second time window based on the determination of the presence of the relevant positive surface unevenness or the relevant negative surface unevenness, indicating surface conditions to a superordinate computer for navigating the vehicle and/or outputting an alarm in a case that a surface rise or a surface dip exceeds a respective rise or dip threshold.

8. The method according to claim 7 wherein the first ultrasonic signal includes a first ultrasonic burst, and the second ultrasonic signal includes a second ultrasonic burst.

9. The method according to claim 7,
wherein emitting of the first ultrasonic signal takes place in a form of a first ultrasonic beam, and
wherein emitting of the second ultrasonic signal takes place in a form of a second ultrasonic beam, and
wherein the first ultrasonic beam is oriented such that, if a surface to be measured is flat, the first ultrasonic beam strikes the surface to be measured at a first distance, at a first point of impact, and
wherein the second ultrasonic beam is oriented such that, if the surface to be measured is flat, the second ultrasonic beam strikes the surface to be measured at a second distance, at a second point of impact, and
wherein, if the surface to be measured is flat, the first distance between the first point of impact (AP1) and a first ultrasound sensor is less than the second distance between the second point of impact and a second ultrasound sensor.

10. The method according to claim 7,
wherein the surface unevenness to be detected is a pothole or a rock or a parking boundary or a step or a ledge or a landing.

11. A device for detecting a surface unevenness or a surface curvature in a vehicle environment, comprising:
  a first ultrasound sensor on a vehicle at a first angle relative to a surface on which the vehicle is operating; and
  a second ultrasound sensor on the vehicle at a second angle relative to the surface on which the vehicle is operating, wherein the second angle is flatter relative to the surface than the first angle;
  wherein the first ultrasound sensor emits a first ultrasonic beam;
  wherein the second ultrasound sensor emits a second ultrasonic beam;
  wherein the first ultrasound sensor receives a reflection of the first ultrasonic beam;
  wherein the second ultrasound sensor receives a reflection of the second ultrasonic beam;
  wherein the first ultrasound sensor converts the received reflection of the first ultrasonic beam into a first reflection signal;
  wherein the second ultrasound sensor converts the received reflection of the second ultrasonic beam into a second reflection signal;
  wherein the first ultrasonic beam is oriented such that if a surface to be measured is flat, the first ultrasonic beam strikes the surface to be measured at a first distance, at a first point of impact;
  wherein the second ultrasonic beam is oriented such that if the surface to be measured is flat, the second ultrasonic beam strikes the surface to be measured at a second distance, at a second point of impact;
  wherein, in a case the surface to be measured is flat, the first distance between the first point of impact and the first ultrasound sensor is less than the second distance between the second point of impact and the second ultrasound sensor;
  wherein the first ultrasound sensor receives the first reflection of the first ultrasonic beam at a first point in time after emitting the first ultrasonic beam;
  wherein the second ultrasound sensor receives the reflection of the second ultrasonic beam at a second point in time after emitting the second ultrasonic beam;
  wherein the device is configured to receive the first reflection signal from the first ultrasonic sensor and compares the first point in time with a first predetermined time window, which begins at a first starting time, which lies after emitting the first ultrasonic beam, and ends at a first ending time after the first starting time;
  wherein the first predetermined time window is set for a first predetermined time period during which the reflection of the first ultrasonic beam is expected, based on a flat surface;
  wherein the device is configured to receive the second reflection signal from the second ultrasonic sensor and compares the second point in time with a second predetermined time window, which begins at a second starting time, which lies after emitting the second ultrasonic beam, and ends at a second ending time after the second starting time;

wherein the second predetermined time window is set for a second predetermined time period during which the reflection of the second ultrasonic beam is expected, based on a flat surface;

wherein the device is further configured to:

determine a flat surface when the first point in time lies within the first predetermined time window and the second point in time lies within the second predetermined time window, or determine a relevant negative surface unevenness or a downward surface curvature when the first point in time lies within the first predetermined time window, and the second point in time is temporally after a temporal end of the second predetermined time window, or when no second point in time could be determined, or determine the relevant negative surface unevenness or the downward surface curvature when the first point in time lies temporally after the first ending time of the first predetermined time window, and the second point in time lies temporally after the temporal end of the second predetermined time window, or when no second point in time could be determined, or determine a relevant positive surface unevenness or an upward surface curvature when the first point in time lies within the first predetermined time window, and the second point in time lies temporally prior to the second starting time of the second predetermined time window, or determine the relevant positive surface unevenness or the upward surface curvature when the first point in time lies temporally prior to the first starting time and the second point in time lies temporally prior to the temporal start of the second predetermined time window, and based on the determination of one of: the flat surface; the relevant negative surface unevenness or the downward surface curvature; or the relevant positive surface unevenness or the upward surface curvature; the device is configured to indicate surface conditions to a superordinate computer for navigating the vehicle and/or one of the device or the superordinate computer is configured to output an alarm in a case that a surface rise or a surface dip exceeds a respective rise or dip threshold.

12. The device according to claim 11, wherein the surface unevenness to be determined includes at least one of a pothole or a rock or a parking boundary or a step or a ledge or a landing.

* * * * *